US007266675B2

(12) United States Patent
Burky et al.

(10) Patent No.: US 7,266,675 B2
(45) Date of Patent: Sep. 4, 2007

(54) PROCESSOR INCLUDING A REGISTER FILE AND METHOD FOR COMPUTING FLUSH MASKS IN A MULTI-THREADED PROCESSING SYSTEM

(75) Inventors: William Elton Burky, Austin, TX (US); Peter Juergen Klim, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/324,399

(22) Filed: Jan. 3, 2006

(65) Prior Publication Data

US 2006/0155966 A1 Jul. 13, 2006

Related U.S. Application Data

(62) Division of application No. 10/422,684, filed on Apr. 21, 2003, now Pat. No. 7,015,718.

(51) Int. Cl.
*G06F 9/30* (2006.01)

(52) U.S. Cl. ...................... 712/219; 712/216; 712/214

(58) Field of Classification Search ................ 712/219, 712/216, 214
See application file for complete search history.

(56) References Cited

U.S. PATENT DOCUMENTS 6,324,640 B1 * 11/2001 Le et al. .................... 712/217
6,435,737 B1 * 8/2002 Wise et al. ................. 712/200
6,553,480 B1 * 4/2003 Cheong et al. ............... 712/23
6,643,204 B1 11/2003 Agrawal
6,701,484 B1 3/2004 Jordan et al.

OTHER PUBLICATIONS

Pleszkun et al, WISQ: A Restartable Architecture Using Queues, 1987, ACM, Proceedings of the 14th annual international symposium on Computer architecture, 290-299.*

* cited by examiner

*Primary Examiner*—Mano Padmanabhan
*Assistant Examiner*—Vincent Lai
(74) *Attorney, Agent, or Firm*—Mitch Harris, Atty at Law, LLC; Andrew M. Harris; Casimer K. Salys

(57) ABSTRACT

A processor including a register file and method for computing flush masks in a multi-threaded processing system provides fast and low-logic-overhead computation of a flush result in response to multiple flush request sources. A flush mask register file is implemented by multiple cells in an array where cells are absent from the diagonal where the column index is equal to the row index. Each cell has a vertical write enable and a horizontal write enable. When a row is written to validate that row's tag value, the column having an index equal to the row selector is automatically reset (excepting the absent cell mentioned above) . On a read of a row, a wired-AND circuit provided at each column provides a bit field corresponding to other rows that have been written since a last reset of the row, which is a flush mask indicating newer tags and the selected tag.

14 Claims, 4 Drawing Sheets

PROCESSOR INCLUDING A REGISTER FILE AND METHOD FOR COMPUTING FLUSH MASKS IN A MULTI-THREADED PROCESSING SYSTEM

CROSS-REFERENCE TO RELATED APPLICATION

The present application is a Divisional Application of U.S. patent application Ser. No. 10/422,684 entitled "REGISTER FILE APPARATUS AND METHOD FOR COMPUTING FLUSH MASKS IN A MULTI-THREADED PROCESSING SYSTEM" filed on Apr. 21, 2003, now U.S. Pat. No. 7,015,718.

BACKGROUND OF THE INVENTION

1. Technical Field

The present invention relates generally to processors and computing systems, and more particularly, to multi-threaded processing systems.

2. Description of the Related Art

Present-day high-speed processors include the capability of simultaneous execution of instructions, speculative fetching of instructions and speculative execution/partial execution of instructions.

In particular, within present-day super-scalar processors, entire program branches may lie within a range of execution from fetching up to just prior to writing final resultant values and groups of instructions whose necessary execution is contingent upon taking a particular program branch may be speculatively loaded and dispatched.

In order to manage such a super-scalar processing system, a completion table is maintained that manages the speculative execution of instructions is included within the processor. The completion table maintains tags that are associated with groups of instructions, so that internal processor elements can determine which groups of instructions have been dispatched. Upon completion or invalidation of instruction groups, the instructions must be flushed from the processor queues.

The above-incorporated patent application describes details of completion table operation and a method and system for implementing flush operations within a processor capable of simultaneously executing multiple threads. A flush table is constructed as register file operations are performed on register file elements to determine which instruction groups to flush in response to flush request indications from various units internal to the processor. However, in order to implement the scheme described in the above-incorporated patent application, logic external to the flush register file is required to perform multiple operations on the flush register file elements in order to determine a flush result that dictates which instruction groups are actually flushed. Either a large external logic is required, or a smaller external logic including multiple clock cycles for performing the required operations is needed.

It is therefore desirable to provide a method and apparatus for determining a flush result that does not require a large external logic circuit or multiple clock cycles.

SUMMARY OF THE INVENTION

The objective of determining a flush result without requiring a large external logic circuit or multiple clock cycles is achieved in a method and processor. The processor includes a flush mask array having multiple storage cells forming an array. The array has no cells on a diagonal corresponding to equal row and column values and each of the cells has a separate vertical write input and a horizontal write input, so that rows of the array may be written with a value corresponding to a tag identifying an instruction group and so that corresponding column cells can be simultaneously reset (excluding the non-existent bit cell corresponding to the row which is maintained at a logic "1" value by design).

Each cell of the array also has a read output for each thread, so that simultaneous read operations qualified by thread selectors can be performed so that a separate flush mask and gtag output can be generated for a specific thread as well as a combined flush mask supporting simultaneous thread access to the flush array.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
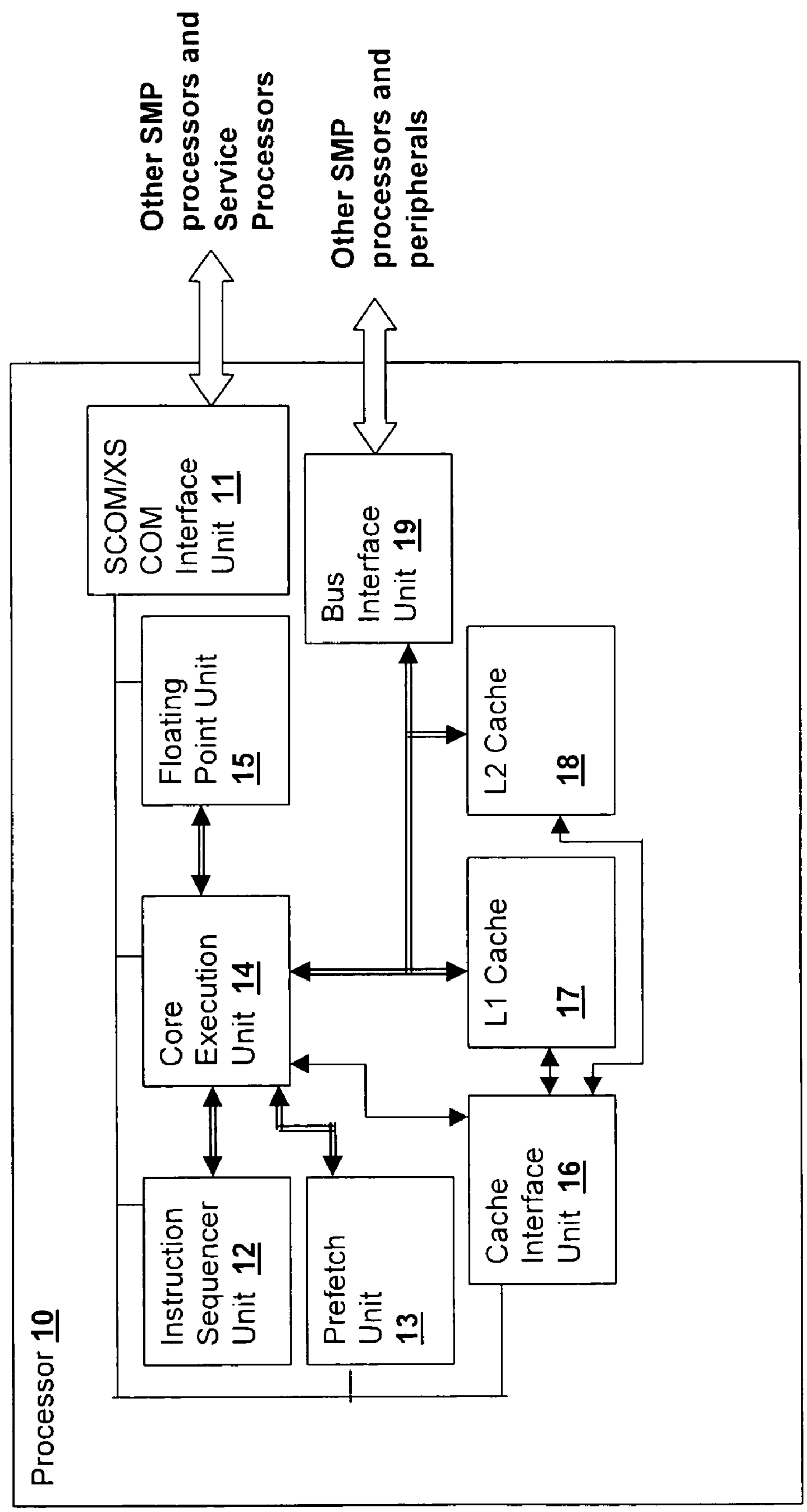
FIG. 1 is a block diagram of a processor in accordance with an embodiment of the invention.

With reference now to the figures, and in particular with reference to FIG. 1, there is depicted a block diagram of a processor 10 embodying a method and an apparatus in accordance with the present invention. Processor 10 is generally of a type used in symmetrical multi-threaded (SMT) processing systems where instructions executed by other processors may implicate values in caches or loaded into resources within processor 10. However, the techniques of the present invention apply to any processor having a flush mask register file for which a flush result must be computed.

Processor 10, includes a core execution unit 14 that controls execution of program instructions and movement of data within processor 10. Core execution unit 14 includes an instruction dispatch unit (IDU) (not shown) that dispatches groups of instructions. Tags identified by the IDU provide an input source to the flush mask register of the present invention.

Core execution unit 14 is coupled to various resources, such as an instruction sequencer unit 12 a prefetch unit 13 a cache interface unit 16, a on-board L1 Cache 17 and L2 Cache 18 as well as a floating point unit 15. An SCOM/XCOM interface unit 11 connects processor 10 to a service processor and other SMP processors in the system. A bus Interface unit 19 connects processor 10 to other processors and peripherals. Various units within processor, as well as external processors and service processors connected via SCOM/XCOM interface unit 11 and external processors connected via bus interface unit 19 may signal a flush of a particular instruction or data group, requiring identification of dependent instruction and data groups that must also be flushed. Internal flush sources include prefetch unit 13, a completion unit within core execution unit 14 and other sources.

Figure 2:
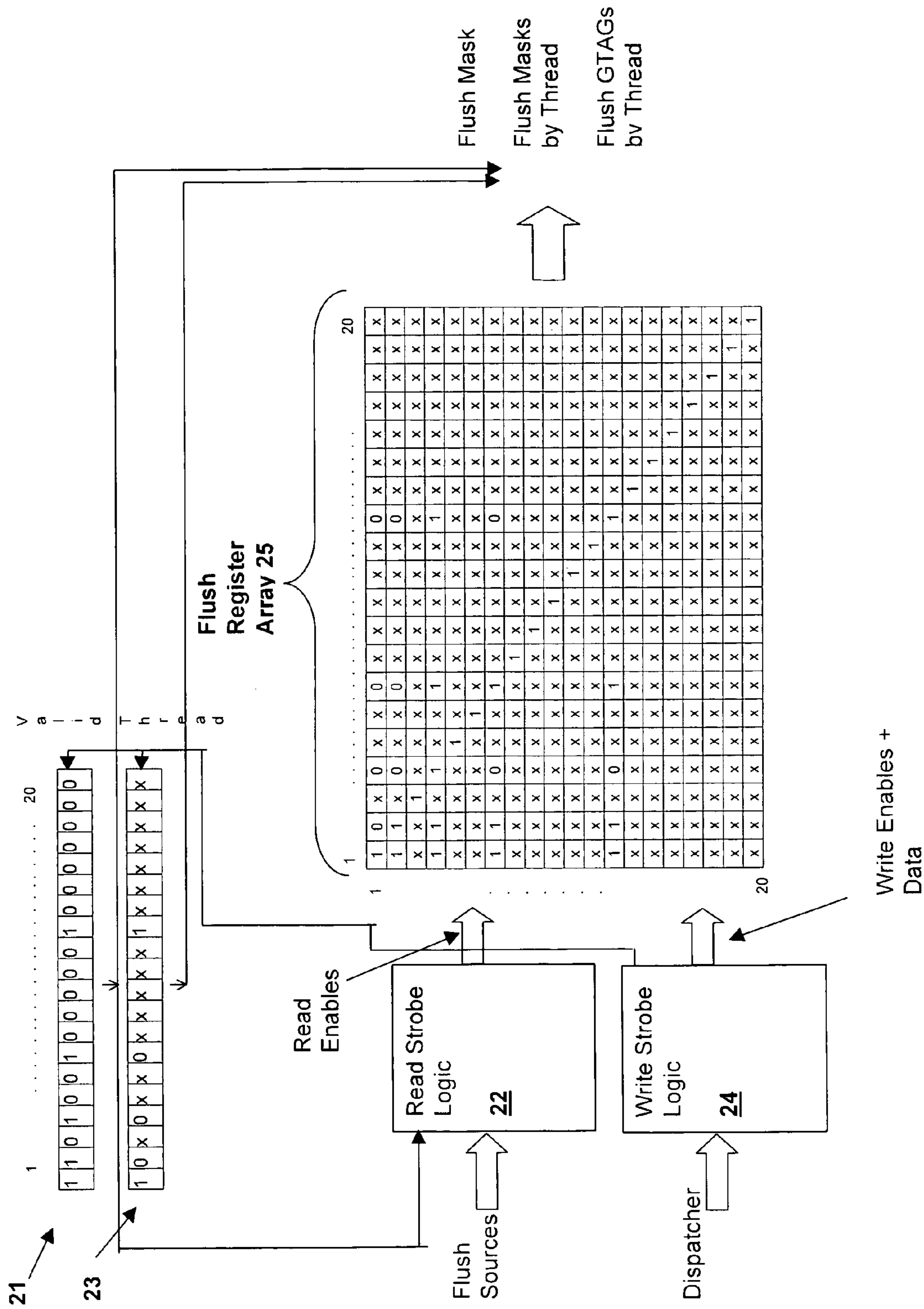
FIG. 2 is a pictorial diagram showing a flush mask register array and associated functional blocks in accordance with an embodiment of the present invention.

Referring now to FIG. 2, details are shown of a flush register array 25 and associated functional blocks, generally located within the above-mentioned completion unit of core execution unit 24, but may be elsewhere located within processor 10. Values within flush mask register array are indicated as set "1", reset "0" and invalid/don't-care values "X". Two registers, a valid register 21 and a thread indication register 23 are provided that each contain a word having bits associated with one of twenty entry rows in flush register array 25. Flush register array 25 stores tags identifying groups of instructions currently valid as bit masks written to rows of flush register array 25 from the IDU within core execution unit 14. Upon dispatch, a bit mask having a bit corresponding to an available entry row as well as bits corresponding to older entries that are valid is written to the available entry row in flush register array 25. Write strobe logic 24 provides the decode and data routing to write the bit mask to flush register array 25, as well as writing a thread indicator bit to thread register 23 and a logical "1" to the corresponding bit in validity register 21.

At flush time, when one or more flush directives are received by read strobe logic 22, read strobe logic 22 generates the required signals to access the selected rows' cell outputs of flush register array 25, qualified by the corresponding rows being marked valid in the valid register 21. In response, five word outputs are generated providing various information to units cooperating to implement the flush. The first is a flush mask identifying all of the instruction groups that need to be flushed (the selected group and all newer groups), the next two are individual flush masks for each thread and the last two are group tag (GTAG) read values for each thread. GTAGs are the identifiers stored in flush register array 25 that have bits set indicating the row location of the GTAG and older valid GTAG row locations.

As the present invention concerns an array of bit stores or "cells", the terms "column index" and "row index" indicate the vertical and horizontal position cells or groups of cells, as do the terms "column numbers" and "row numbers".

Figure 3:
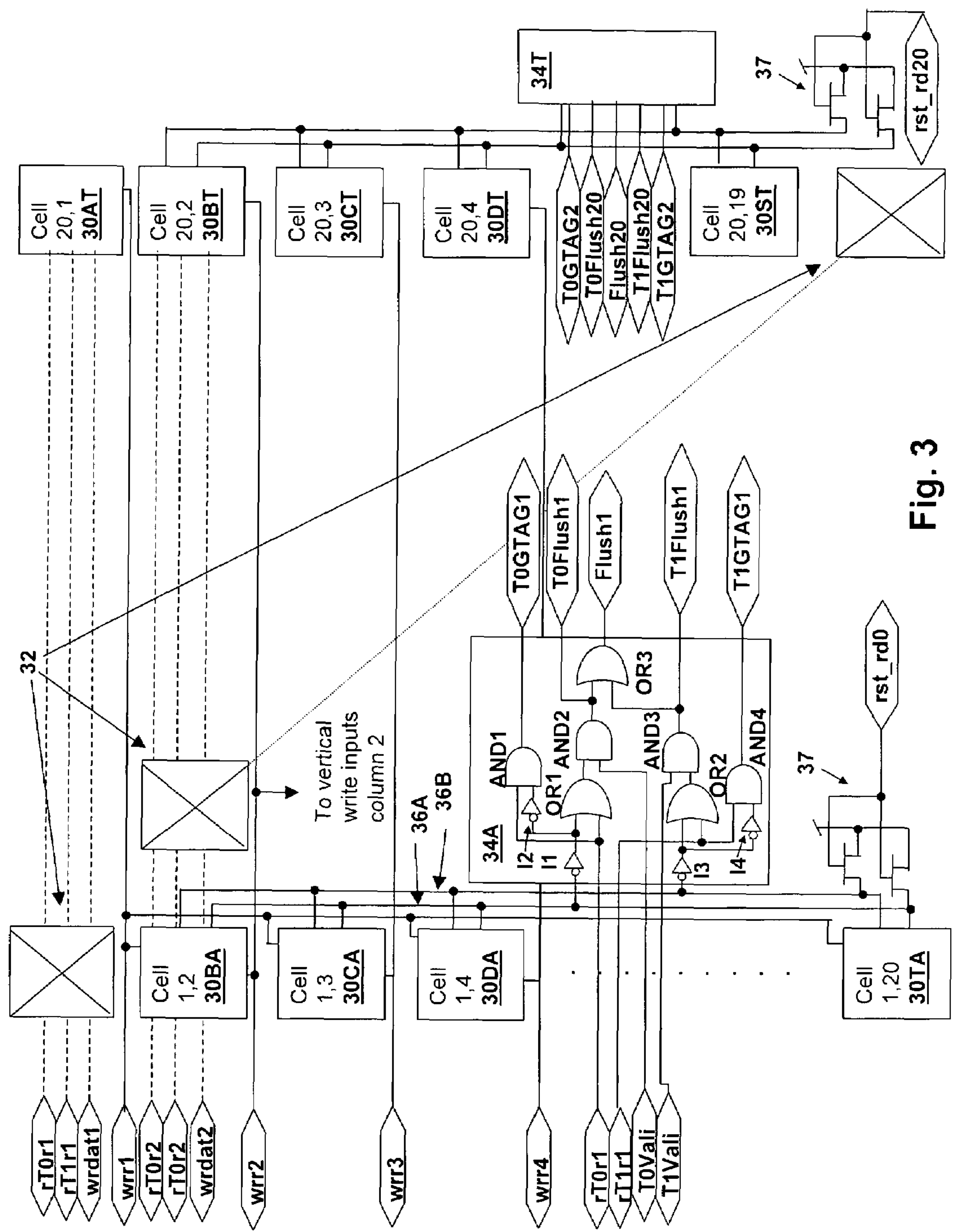
FIG. 3 is a schematic diagram depicting a flush mask register array in accordance with an embodiment of the present invention.

Referring now to FIG. 3, details of flush register array 25 are shown. A plurality of cells "30rc" are arranged in a matrix. The designators are of the form "30rc", where r is a letter from A-T indicating a row number between 1 and 20 and c is a letter from A-T indicating the column number. The cells present in flush register array will be hereinafter referred to as cells 30BA-30ST. Positions 32 for matrix locations having equal column and row numbers are empty, i.e., there are no cells 30*xx* where x is a row and column number specifying an equal row and column index. Absent cell locations in FIG. 3 are indicated by crossed-out boxes. The absence of the above-mentioned cells provides not only a reduction in circuit area, but simplifies the logic required to generate the flush outputs mentioned above. The flush logic outputs are generated by flush logic blocks 34A-T one for each column of flush register array 25. Flush logic blocks 34A-T are coupled to data outputs of each cell in their respective column, but the read enable inputs of the column cells are wired in a particular manner to provide a wired-AND logic computation that yields the desired flush mask outputs identifying the proper flush groups.

Each cell 30BA-30ST includes a vertical write enable input and a horizontal write enable input. The horizontal write enable inputs of cells 30BA-30ST are coupled to the row write strobe wrr1-20 (provided by write strobe logic 24 of FIG. 2) for the row in which the cell is a member. The row write strobe enables the GTAG bit corresponding to the cell position in the row to the storage of the cell, resulting in a write of the GTAG to the row. The vertical write enable inputs of cells 30BA-30ST are coupled to the row write strobe wrr1-20 corresponding to the number of the column in which the cell is a member and are reset inputs that set the storage value of the cell to a logical zero. Since there are no cells in positions for which the column number is equal to the row number, cells are only activated for a horizontal write or a vertical write and never both. Data inputs to the row consist of GTAG values having a bit set for each presently valid group. Since the group for which a tag is being written is always valid, the absence of the cell at the equal row, column position guarantees a value of "set" for the bit position corresponding to the group tag being written. The write strobes connected to the vertical write enables of the other cells in the column, when active, cause a reset of the bit corresponding to the group tag in all other rows, marking those rows (if valid) as corresponding to older group tag values, i.e., instruction groups that were earlier-dispatched. As flush register array 25 is populated with group tags, newer instruction groups can be identified by set bits that are not set in earlier-dispatched groups, as the bits for all currently valid groups have been set via row writes subsequent to the last reset of the other columns. As further rows are written, the column writes (vertical writes) will clear the bits of other rows in the columns corresponding to the further-written rows, marking them as rows older than the rows for which bits are set in those columns.

The computation of the flush mask and group tag outputs is performed by column logic blocks 34A-T in response to one or more flush directives received at read strobe logic 22 of FIG. 2. One or more read strobes rT0*r*1-20 for thread 0 and rT1*r*1-20 for thread 1 are activated, causing each activated cell 30BA-30ST in the selected rows to place their data on bitlines 36A (for thread 0 read enabled) and 36B (for thread 1 read enabled). The use of common bitlines for the outputs provides a wired-AND function that combines each enabled cell in a column. The cells enabled onto bitlines 36A-B may be a single cell for a single group tag read, or may comprise multiple cells when multiple flush directives are received by read strobe logic 22. Preset circuits 37 are used to preset bitlines 36A-B prior to enabling any read strobes, so that bitlines 36A-B will be maintained at a logical "1" value unless a bit in an enabled row for the particular column is a zero. The output of bitlines 36A-B will be a zero unless an instruction group having a tag in a row number equal to the column number of the particular column is newer than all of the enabled rows.

Flush logic blocks 34A-T receive the bit line outputs via AND gates AND1 and AND4, qualify the TOGTAG1-20 and T1GTAG1-20 outputs with the thread read strobes for the row corresponding to the column number by performing a logical AND operation on the thread read strobes and the bitline values provided through inverters I1-4. The AND operation results in the group tag output for each thread being a zero for all bit positions (column positions) corresponding to non-enabled rows for each thread and a one only in the bit position corresponding to the oldest entry enabled for reading. Since a zero will be present in the older rows at column positions for newer rows during a multiple row read, the only bit that will be set in the TOGTAG1-20 and T1GTAG1-20 outputs will be the bit in the bit position corresponding to the row number of the oldest selected entry (the entry itself cannot reset bitlines 36A-36B in its own row, since there is no cell at that position).

Flush logic blocks 34A-T also compute thread-specific flush masks T0Flush1-20 and T1Flush1-20 by combining the inverted bitline outputs from inverters I1 and I3 with the read enable rT0*r*1-20 and rT1*r*1-20 for the row corresponding to the column of the particular flush logic block in a logical OR operation via OR gates OR1 and OR2. The outputs of OR gates OR1 and OR2 will be a "1" for columns having a column number to a read-enabled row for the associated thread (indicating an active flush request for that row/thread) and any row having an entry newer than all of the read-enabled rows. The result is a flush mask T0Flush1-20 and T1Flush1-20 that identifies all flush-requested rows plus rows containing newer entries for the associated thread. OR gate OR3 combines the thread-specific flush masks to produce a global flush mask Flush1-20 having bit positions set for all flush requested entries and identified newer entries.

Figure 4:
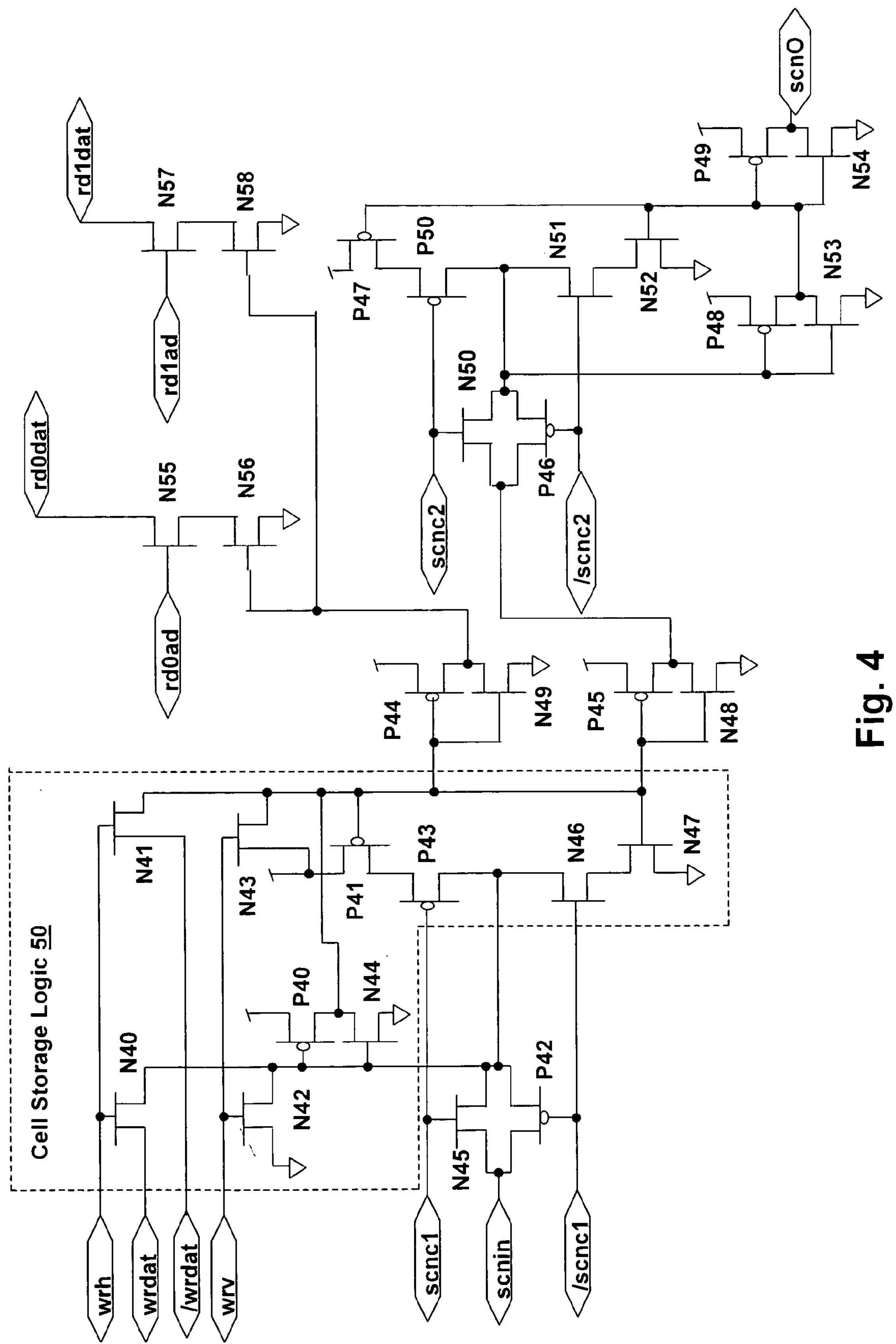
FIG. 4 is a schematic diagram depicting a cell within the flush mask register array of FIG. 3.

Referring now to FIG. 4, a schematic diagram of one of individual cells 30BA-30ST is depicted. The schematic includes scan logic for testing and controlling the state of the individual cell, and is included herein for completeness, although the scan logic is not required to provide the functionality of cells needed to implement the flush register array of the present invention. Cell Storage logic 50 includes the logic necessary to store and retrieve a static value from cells 30BA-30ST.

A storage element is formed by transistors P40 and N44 connected as an inverter back-to-back with another inverter formed by transistors N47 and P41. Transistors P43 and N46 are interposed between transistors N47 and P41 so that scan test circuitry can set the storage element through a pass gate formed by transistors N45 and P42. Scan input data is provided as signal scnin. Signals scnc1 and /scnc1 are complementary scan input strobes that place the data on scnin on the input of the inverter formed by transistors P40 and N44. Signal wrh is the horizontal write enable mentioned above for writing data values, provided as complementary pair wrdat and /wrdat to set the state of the storage element via transistors N40 and N41. The vertical write enable signal is wrv and enables transistors N42 and N43 to reset the state of the storage element.

An inverter formed by transistors P44 and N49 buffers the output of the storage element and provides an output to control transistors N56 and N58 that provide a signal for the two thread data read outputs rd0*dat* for thread 0 and rd1*dat* for thread 1. Transistors N55 and N57 enable the read data for thread 0 and thread 1 respectively, and are enabled by read enables rd0*ad* and rd1*ad*. An inverter formed by transistors P45 and N48 buffers the output of the storage element and provides a scan output from the storage element through a pass gate formed by transistors N50 and P46, that are enabled by complementary scan output sample signals scnc2 and /scnc2. An inverter formed by transistors P48 and N53 coupled back-to-back with another inverter formed by transistors P47 and N52 forms a scan latch enabled by interposed transistors P50 and N51 that are enabled by the opposite phase of scan output sample signals from the pass gate enable, latching the output of the pass gate. Transistors P49 and N54 form an inverter for buffering the scan latch output to scan output signal scn0.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A processor comprising:

one or more processing units including flushable queues, said processing units having flush mask inputs for receiving a flush mask directing flush of queue entries identified by said flush mask; and a flush mask register having a flush mask output coupled to said flush mask inputs of said processing units, said flush mask register comprising an array of bit stores populating a matrix of storage locations comprising rows for holding tags identifying said queue entries excepting absent bit stores in each row at a column position equal to a row number of each row, said flush mask register further comprising logic for performing a column reset simultaneously with a write of a first tag to a selected row of said flush mask register, whereby a selected column having a column index equal to said row index of said selected row is set to a value completely reset excepting a bit associated with a particular one of said absent bit stores that is within said selected row and said selected column.

2. The processor of claim 1, further comprising:

a plurality of logical AND gates, each associated with a column of said register array and each having a plurality of inputs coupled to corresponding outputs of said bit stores within said associated column, whereby an output of a first AND gate for said selected column provides a bit indication that another row was written subsequent to a last write of said selected row, further indicating that a tag stored in said other row is newer than a second tag stored in said selected row; and a flush mask output circuit for presenting outputs of said AND gates as a flush mask word, each of said AND gate outputs providing a bit position of said flush mask.

3. The processor of claim 2, wherein each of said bit stores comprises a first output circuit associated with a first thread and a second output circuit associated with a second thread, wherein said plurality of AND gates comprises a first plurality and a second plurality of AND gates, said first plurality associated with said first thread and having a plurality of inputs coupled to corresponding first outputs of said bit stores, and said second plurality associated with said second thread and having a plurality of inputs each coupled to corresponding second outputs of said bit stores, and wherein said flush mask output circuit comprises a first output circuit for presenting outputs of said first plurality of AND gates as a first flush mask word associated with said first thread and a second output circuit for presenting outputs of said second plurality of AND gates as a second flush mask word associated with said second thread.

4. The processor of claim 3, further comprising a thread register for storing a thread indication for each of said rows, and wherein said thread indication is input to said first output circuit and said second output circuit, wherein said first output circuit and said second output circuit qualify said first flush mask word and said second flush mask word, whereby only a flush mask word for a thread associated with said tag stored in said selected row is produced.

5. The processor of claim 3, further comprising a combined flush output circuit for combining said first and said second flush mask word, whereby a combined flush mask is as said flush mask output to said processing units.

6. The processor of claim 3, further comprising a third output circuit for presenting a tag value for said selected row, wherein said third output circuit is coupled to outputs of said plurality of AND gates wherein each of said AND gate outputs is further qualified by a read strobe for reading a row having a row index equal to a column index of the column associated with each OR gate, whereby said outputs of said plurality of AND gates provide logical zeros in bit positions of said tag value for bit store outputs other than said selected column, and a logical one value for said selected column.

7. The processor of claim 3, wherein said AND gates are wired-AND gates, wherein said plurality of inputs of said wired-AND gates comprise at least one input connected to a plurality of said corresponding outputs of said bit stores, and further comprising a plurality of precharge circuits each coupled to one of said at least one input for presetting a state of said at least one input prior to reading said bit stores.

8. The processor of claim 2, further comprising a valid register for storing a validity indication for each of said rows, and wherein said validity indication is input to said flush mask output circuit, wherein said flush mask output circuit qualifies said flush mask word, whereby only a flush mask word is produced when a valid tag is stored in said selected row.

9. A method for managing one or more completion queues in a processing system, comprising:

providing a plurality of bit stores implementing an array excepting a diagonal corresponding to equal column and row indices;

writing a tag to a selected row of said array; and simultaneously resetting all bit stores in a column having a selected column index equal to a row index of said selected row.

10. The method of claim 9, further comprising:

simultaneously reading multiple rows of said array;

simultaneously with said reading, combining bits of all rows of said array for columns having indices equal to indices of said multiple rows to produce a flush mask containing set bit positions indicating tag values written subsequent to a last resetting of columns having indices equal to indices of said multiple rows.

11. The method of claim 10, further comprising qualifying said flush mask to include only set bit positions corresponding to indices of said multiple rows to produce a flush tag output.

12. The method of claim 10, further comprising accessing a thread indication register to provide a thread indicator for each of said multiple rows, and wherein said combining separately combines rows containing tags associated with a first thread and rows containing tags associated with a second thread to produce a first flush mask output associated with said first thread and a second flush mask output associated with said second thread.

13. The method of claim 12, further comprising second combining said first flush mask output and said second flush mask output to produce a combined flush mask output.

14. The method of claim 10, wherein said combining is performed by enabling outputs of bit cells in columns having indices equal to indices of said multiple rows onto common bitlines associated with each column, whereby a wired-AND action provides said combining.

* * * * *